(12) United States Patent
Callahan

(10) Patent No.: US 8,380,485 B1
(45) Date of Patent: Feb. 19, 2013

(54) DEVICE FOR AND METHOD OF LANGUAGE PROCESSING

(75) Inventor: Susan E. Callahan, Catonsville, MD (US)

(73) Assignee: The United States of America as Represented by the Director, National Security Agency, Washington, DC (US)

( * ) Notice: Subject to any disclaimer, the term of this patent is extended or adjusted under 35 U.S.C. 154(b) by 728 days.

(21) Appl. No.: 12/460,906

(22) Filed: Aug. 13, 2009

(51) Int. Cl.
*G06F 17/20* (2006.01)
*G06F 17/00* (2006.01)

(52) U.S. Cl. ........... 704/1; 704/2; 704/9; 380/1; 380/59; 726/1; 726/22

(58) Field of Classification Search ............... 726/1, 22; 380/1, 59; 704/1–10, 200, 270–278; 715/200, 715/209, 210
See application file for complete search history.

(56) References Cited

U.S. PATENT DOCUMENTS

| | | | |
|---|---|---|---|
| 4,502,128 A | 2/1985 | Okajima et al. | |
| 4,742,481 A * | 5/1988 | Yoshimura | 704/10 |
| 4,829,423 A * | 5/1989 | Tennant et al. | 704/8 |
| 4,864,503 A * | 9/1989 | Tolin | 704/2 |
| 4,914,590 A * | 4/1990 | Loatman et al. | 704/8 |
| 4,958,285 A | 9/1990 | Tominaga | |
| 4,974,191 A * | 11/1990 | Amirghodsi et al. | 704/8 |
| 5,070,478 A * | 12/1991 | Abbott | 715/210 |
| 5,321,608 A * | 6/1994 | Namba et al. | 704/9 |
| 5,384,702 A * | 1/1995 | Tou | 704/9 |
| 5,583,761 A * | 12/1996 | Chou | 704/2 |
| 5,787,386 A * | 7/1998 | Kaplan et al. | 704/8 |
| 5,974,372 A | 10/1999 | Barnes et al. | |
| 6,470,306 B1 * | 10/2002 | Pringle et al. | 704/3 |
| 6,526,426 B1 * | 2/2003 | Lakritz | 704/8 |
| 6,993,474 B2 * | 1/2006 | Curry et al. | 704/3 |
| 7,216,073 B2 * | 5/2007 | Lavi et al. | 704/9 |
| 7,308,399 B2 * | 12/2007 | Fallen-Bailey et al. | 704/8 |
| 7,398,214 B2 * | 7/2008 | Boegelund et al. | 704/277 |
| 7,813,918 B2 * | 10/2010 | Muslea et al. | 704/9 |
| 7,840,400 B2 * | 11/2010 | Lavi et al. | 704/9 |

* cited by examiner

*Primary Examiner* — Bernarr Gregory
(74) *Attorney, Agent, or Firm* — Robert D. Morelli

(57) ABSTRACT

The present invention is a device for and method of language processing that includes a communication database of communications, a transcription database of transcripts for the communication, an extractor for extracting a visual representation of each communication, a first displayer for displaying a visual representation of a communication and its transcription, a segmentor for segmenting a visual representation, a media player, a first editor for blanking portions of a transcription and adding text, a second editor for filling in blanks and adding text, a second displayer for displaying a transcription that were blanked along with the corresponding entries made by the second editor and adding textual information, and a third displayer for providing feedback.

16 Claims, 5 Drawing Sheets

DEVICE FOR AND METHOD OF LANGUAGE PROCESSING

FIELD OF INVENTION

The present invention relates, in general, to data processing: speech signal processing, linguistics, language translation and audio compression/decompression and, in particular, to multilingual or national language support.

BACKGROUND OF THE INVENTION

Analyzing language, developing language courseware, teaching a language, and learning a language has become increasingly complex and demands the use of many different devices. In order to analyze language, develop language courseware, teach a language, and learn a language in the most efficient and productive manner, it is imperative that all of the tools for conducting such activities be at the fingertips of the analysts, developer, instructor, and student.

Prior art devices and methods of using graphical user interfaces for analyzing language, developing language courseware, teaching a language, and learning a language involve many cumbersome audio, video, and text-based tools that may not be connected and do not communicate with one another. It is especially difficult for the prior art to handle multilingual input.

In the prior art, language-instruction media is presented in printed or audio-visual form. Prior art audio-visual players, commonly referred to as media players, have minimal functionality and few, if any, advanced features. Students using printed forms could only complete exercises by typing or hand-writing answers onto the printed forms.

Disadvantages of the prior art include unsophisticated media players and inadequate communication between media players and courseware.

U.S. Pat. No. 5,974,372, entitled "GRAPHICAL USER INTERFACE (GUI) LANGUAGE TRANSLATOR," discloses a method of translating the display language of a computer application to a user-selectable language. The user initially selects the language by suggesting a translation for the application, and upon subsequent uses of the application, this invention automatically translates the display language of the application. U.S. Pat. No. 5,974,372 is hereby incorporated by reference into the specification of the present invention.

U.S. Pat. No. 4,958,285, entitled "NATURAL LANGUAGE PROCESSING SYSTEM," discloses a device for processing text by applying grammar rules and incorporating information contained in a dictionary. The device examines the text input to determine the applicability of each grammar rule and verifies that each rule is followed. U.S. Pat. No. 4,958,285 is hereby incorporated by reference into the specification of the present invention.

U.S. Pat. No. 4,502,128, entitled "TRANSLATION BETWEEN NATURAL LANGUAGES," discloses a method for language translation. The method takes a natural language sentence and divides it up into its parts of speech. Using the parts of speech, the method matches the original word with an appropriate word in the target language. The translated words are then pieced together appropriately. U.S. Pat. No. 4,502,128 is hereby incorporated by reference into the specification of the present invention.

There is a need for a device and method of analyzing language, developing language courseware, teaching a language, and learning a language in an efficient and streamlined manner while allowing maximum flexibility to language analysts, instructors, and students. The present invention provides such a device and method.

SUMMARY OF THE INVENTION

It is an object of the present invention to process language.

The present invention is a device for and method of language processing.

The device includes a communication database for receiving at least one communication, where each communication is in at least one format (i.e., audio, video, graphic).

The device includes a text database for receiving a transcription for each received communication for which transcription is possible, where each character in a transcription is associated with a location in the format of the corresponding communication that is represented by the transcribed character.

The device includes an extractor for extracting a visual representation of each communication received (i.e., energy waveform for audio, which could include one or more speakers, bar for representing length of video or area of graphic).

The device includes at least one first displayer (e.g., a window on a computer screen) for displaying a visual representation of a communication and its transcription, where the first displayer includes an orthography selector for selecting the orthography of the transcription.

The device includes a segmentor for segmenting the visual representation of a selected communication, where each segment is uniquely identified, and where each location in the corresponding transcription is identified with the same identifier.

The device includes a media player (audio, video) for playing a communication if possible.

The device includes a first editor for blanking, in a first displayer, portions of the transcription of a communication and adding textual information.

The device includes a second editor for filling in blanks in a transcription and adding textual information.

The device includes a second displayer for displaying the portions of a transcription that were blanked along with the corresponding entries made by the second editor and adding textual information.

The device includes a third displayer for providing feedback.

DETAILED DESCRIPTION

The present invention is a device for and method of language processing. The present invention is user-friendly and does not require the user to have any special computer science skill about that of a typical computer user. The present invention enables the analysis of language, the creation of language-learning courseware, the instruction of language-learning, and the completion of language-learning exercises by language students. The present invention is a multimedia device and method that enables the development of mediabased foreign language courseware to facilitate aural, graphic, and video-based contextual analysis training, transcription and translation. The present invention integrates media, media player, courseware, and student responses into one display (e.g., window).

Figure 1:
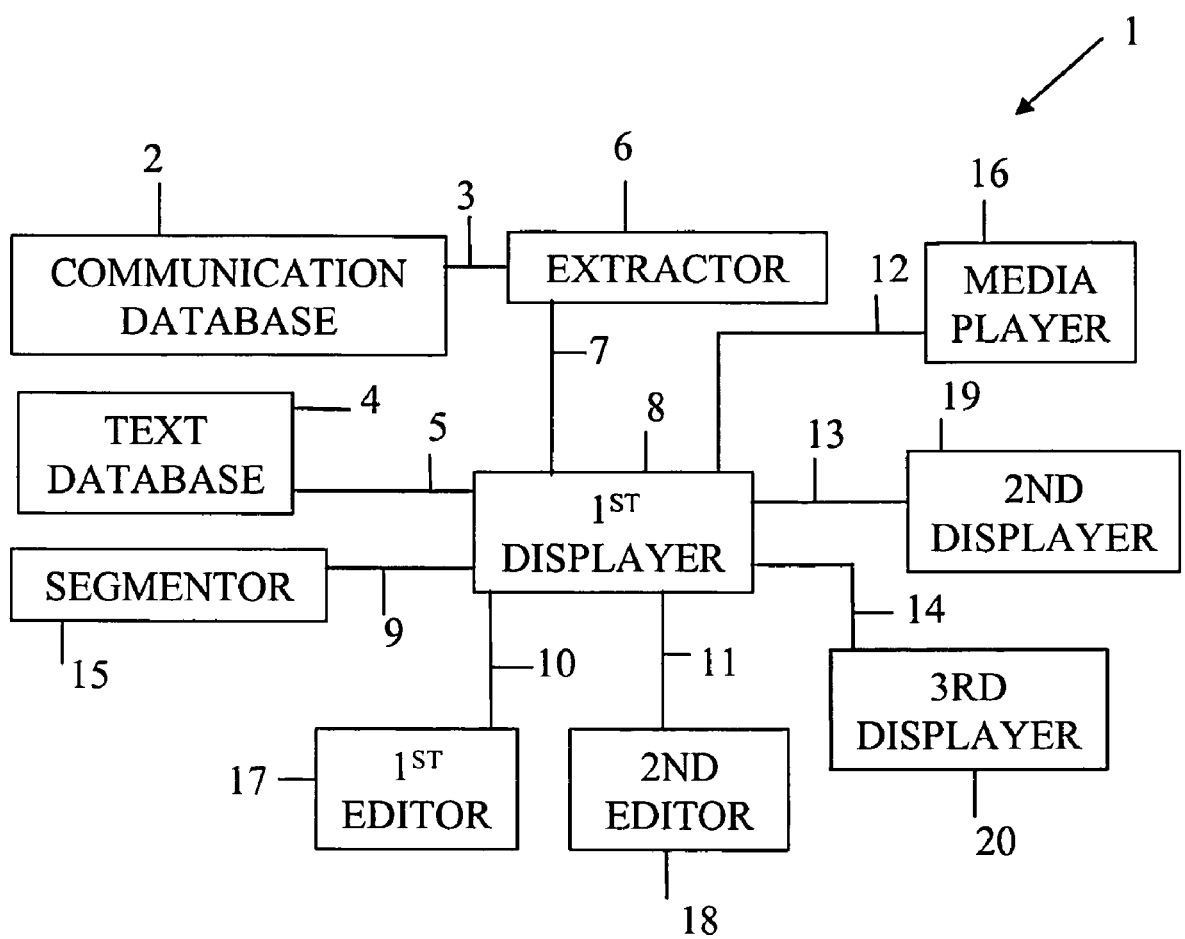
FIG. 1 is a schematic of the present invention.

FIG. 1 is a schematic of the preferred device 1 of the present invention.

The device 1 includes a communication database 2 for receiving at least one communication, where each communication is in at least one format (i.e., audio, video, graphic). The device 1 can process a communication in any orthography or writing system (e.g., left-to-right, right-to-left, top-to-bottom, ideograms). The device 1 can process a communication that includes a mixture of orthographical styles (e.g., left-to-right and right-to-left orthography in the same sentence). The communication database 2 has an output 3 for transmitting a communication.

The device 1 includes a text database 4 for receiving a transcription (i.e., a textual representation of a communication in the language of the communication) for each received communication for which transcription is possible, where each character (e.g., letter, ideogram) in a transcription is associated with a location in the format of the corresponding communication that is represented by the transcribed character. That is, each textual representation in a transcription is identified with the point in the corresponding communication that caused the textual representation to be created, and vice versa. The text database 4 has an output 5 for transmitting a transcript of a communication.

The device 1 includes an extractor 6 for extracting a visual representation of each communication received (i.e., an energy waveform for audio, which could include one or more speakers, a bar for representing length of video or area of graphic). If multiple (e.g., 2) speakers appear in a communication then multiple energy waveforms are extracted from the communication, one for each speaker. When multiple visual representations are extracted, they will be displayed separately but in sufficiently close proximity to indicate the association between the representations (e.g., one on top of the other for side-by-side comparison). The extractor 6 has an output 7 for transmitting visual representations.

The device 1 includes a first displayer 8 for displaying a visual representation of a communication and its transcription. In the preferred embodiment, the first displayer 8 is a window on a computer. The first displayer 8 includes a first input connected to the output 5 of the text database 4 for receiving a transcript of a communication. The first displayer 8 includes a second input connected to the output 7 of the extractor 6 for receiving a visually representation, if available, for a communication received from the text database 4. The first displayer 8 includes a third input 9 for receiving input to segment the visual representation of a communication. The first displayer 8 includes a fourth input 10 for receiving input to edit the received transcription and to select the orthography of a transcription. Edits may come from analysts, language-instruction course developers, or language instructors. Details concerning editing are described below. The first displayer 8 includes a fifth input 11 for receiving input to edit courseware and to select the orthography of a transcription. Users, via the fourth input 10 and the fifth input 11, can easily navigate through the visual representation of a communication and/or its associated transcription by selecting an area within the visual representation of transcription (e.g., clicking an area via a computer mouse, keyboard key, foot pedal, or any other suitable input device). The first displayer 8 includes a first output 12 for porting a communication to a media player to be played, if possible.

The first displayer 8 includes a second output 13 for porting analyst output or courseware to be displayed to an analyst for analysis or to a language student as a language exercise. The first displayer 8 includes a third output 14 for porting an instructor key for an exercise and a student's responses to the exercise for side-by-side display. The device 1 integrates courseware, media, and media player into one device. The present invention allows for multiple exercises and media to be processed simultaneously. The device 1 allows multilingual input from any font set and keyboard layout and can mix different orthographic languages (e.g., right-to-left languages such as Arabic and Persian with left-to-right languages such as English and French). The device 1 allows insertion of hyperlinks to the Internet and to documents (e.g., reference material). The device 1 supports any text formatting capability (e.g., highlight, bold, underline, bullets, and color). The device 1 allows for the insertion of pictures and maps for reference. The device 1 allows for tagging and linking of text/audio/video material for quick and easy reference and comparison. Text can be copied/cut/pasted into each component of the device 1 that allows such an operation.

The device 1 includes a segmentor 15 for segmenting the visual representation of a selected communication, where each segment is uniquely identified, and where each location in the corresponding transcription is identified with the same identifier. The segmentor 15 has an output connected to the third input 9 of the first displayer 8. An analyst, courseware developer, or instructor segments the visual representation of a communication for his own purposes. For example, an instructor segments the visual representation of a communication in audio, video or graphic format. Since each part of a visual representation is associated with the corresponding transcript, segments established by an instructor are linked with the associated transcript. A segment is identified with a user-definable identification scheme (e.g., number, name, title, color, graphic, etc.). The corresponding transcription is assigned the same identification for easy identification and navigation of visual representation and corresponding text and vice versa. The device 1 provides a textual representation that captures the time boundaries of speech segments, locational boundaries of graphic segments, and the audio and locational boundaries of video, and links them together. Media segmentation is achieved with a few mouse clicks (click & drag or highlight+control/alt/b). Media segmentation and linkage to courseware enables easy content-based navigation of audio/video/graphic media. Instructors have the ability to easily divide or segment input media into chunks or segments, which are automatically linked with the corresponding text segment. Associated media and exercise segments are similarly numbered. This linkage enables easy content-based navigation of audio/video/graphic media. Segment start and end times are noted. Similarly identifying segmentations of a visual representation and their corresponding locations in a transcription enables faster navigation of language material. Speakers in a video may be identified, if desired, through marking/highlighting faces with circles.

The device 1 includes a media player 16 (e.g., audio, video) for playing a communication, if possible. The media player 16 includes an input connected to the first output 12 of the first displayer 8 for controlling the operation of the media player 16. The media player 16 enables the playing of discrete sections of a visual representation. The media player 16 plays/displays any media format (e.g., mp3, .au, .mu, .wav, .jpg, .pdf, .bmp, .mp4, .mov, .wmv), accommodates unlimited audio file length, and includes audio manipulation features such as speed rate changer, user expansion/compression of energy signal, forward/backward skipping with mouse or key strokes, looping by highlighting section of media and playing it, single or multi-channel audio/media input, independent volume control per channel, cropping, editing, inserting silence, and foot pedal operation. Separate volume control is available for each speaker, including mute (auto-mute other speaker) to mitigate speakers talking over each other.

The device includes a first editor 17 for editing a transcription of a communication. For example, an instructor may replace parts of a transcription with blanks that a student would then fill in as an exercise. A blank may concern a partial word, a single word, or multiple words. In addition, the first editor 17 allows for the adding textual information to a transcription (e.g., glossaries, grammar notes, quizzes, comments, hints, instructional guidance). The first editor 17 has an output connected to the fourth input 10 of the first displayer 8 for editing a transcription displayed by the first displayer 8. Instructors can easily create many different types of exercises, everything from aural vocabulary drills to expository writing. A blank for a student to type in is uniformly sized to not provide any unintended hints to the student and but are expandable to accommodate as much text as student wishes to insert. Text in a blank is visible and printable. Instructors may also include text in a blank for students to correct. The text in a blank may be of a different format or color to enable ease of location. Instructors may create a wide range of exercises such as aural vocabulary drills, grammar drills, transcription exercises (full verbatim or fill-in-the-blank), translation (verbatim, summary gist or guided translation) from graphic text, translation (verbatim, summary gist or guided translation) from aural text, combination transcription/translation exercises (full verbatim or guided), language identification training, dialect identification training, listening comprehension exercises, memory drills, contextual analysis drills, expository writing, quality control exercises: correction/editing of errorful or incorrect text. Instructor may preview the exercise.

The device 1 includes a second editor 18 for filling in blanks in a transcription and adding textual information. The second editor 18 includes an output connected to the fifth input 11 of the first displayer 8. The second editor 18 allows multilingual input in any font set and keyboard layout. Student types answer in blank. The blank expands to fit student's response. Tagging allows user to mark items for further review and/or group items. Students can only type in editable areas created by the instructor. Students cannot edit or delete text or alter text or audio segmentation. User can customize view. View of exercise can be single column or multi-column. Column width and height can be resized by user. Individual tool bars can be moved around, hidden or even dragged out of the tool window to maximize the size of the exercise. Font size, type, color, background color can all be customized by user. User can cut and paste text in and out of exercise. Text in the exercise is searchable. Text items in the exercise can be tagged to link contextual or lexical items. Words or phrases can be automatically looked up in on-line dictionaries. User can print exercise. Segment numbering and speaker identification prints along with exercise. User can print notes separately or together with exercise.

The device 1 includes a second displayer 19 for displaying the student's responses to an exercise next to the expected responses. The second displayer 19 has an input connected to the second output of the first displayer 8 for receiving the instructors expected responses and the student's responses. Instructors can evaluate student input through a side-by-side comparison view with the expected responses, and then annotate student input with feedback and comments. Such a side-by-side view may be used for multiple purposes: side-by-side transcription and translation as multilingual input is capable in all windows, triangulation capability of side-by-side text with audio. If a student selects a segment in one view, a cursor in the other view goes to the corresponding segment, the two segments are aligned to each other, and the media player 16 plays the segment.

The device 1 includes a third displayer 20 for providing feedback. The third displayer 20 has an input connected to the third output 14 of the first displayer 8 for receiving feedback provided by an instructor through the first editor 17.

Figure 2:
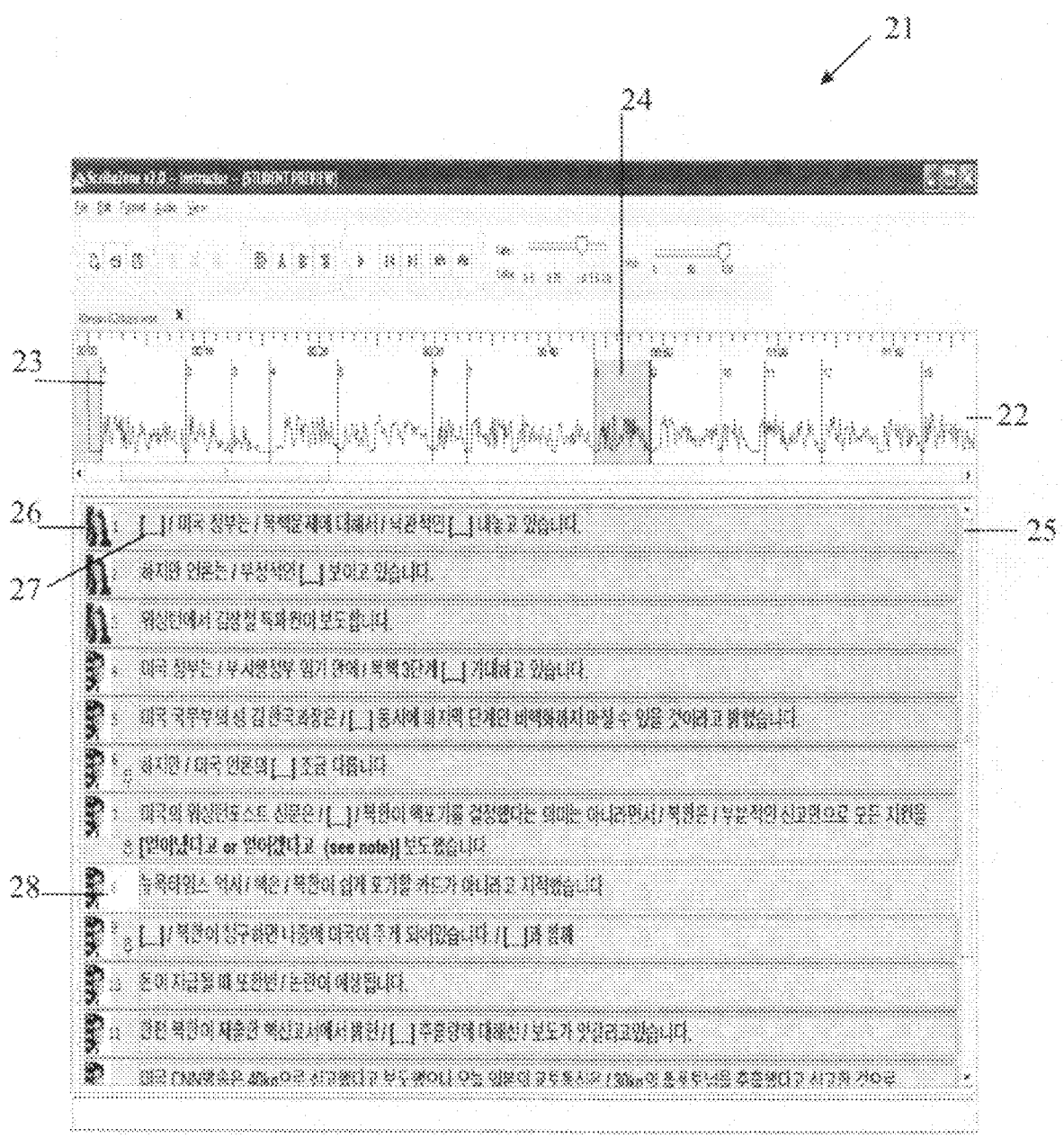
FIG. 2 is an illustration of a display of segmented audio and corresponding text with blanks.

FIG. 2 is an illustration of a first display 21 of segmented audio and corresponding text with blanks that results from the present invention. The display 21 is a window on a computer. However, other display schemes are possible (e.g., iPhone®, Blackberry®, etc.). The display 21 includes a waveform 22 of an audio communication. The waveform 22 has been segmented, where each segment 23 is uniquely identified. The segments 23 are uniquely identified with numbers, but other suitable unique identifiers are possible (e.g., letters, icons, colors, etc.). One segment 24, numbered eight, has been selected. The transcript 25 of the waveform 22 appears in the window 21. Portions of the transcript 25 that correspond to the segments 23 in the waveform 22 appear with the same unique identifiers as in the segments 23. Each individually identified transcript 25 portion includes an icon 26 to represent the speaker of that transcript 25 portion, which also corresponds to the audio represented by the corresponding segment 23 in the waveform 22. An instructor replaced portions of the transcript 25 with blanks 27 to create an exercise for a student. The portion of the transcript 25 that is selected 24 in the waveform 22 is highlighted 28 in the transcript 25, which is also numbered eight.

Figure 3:
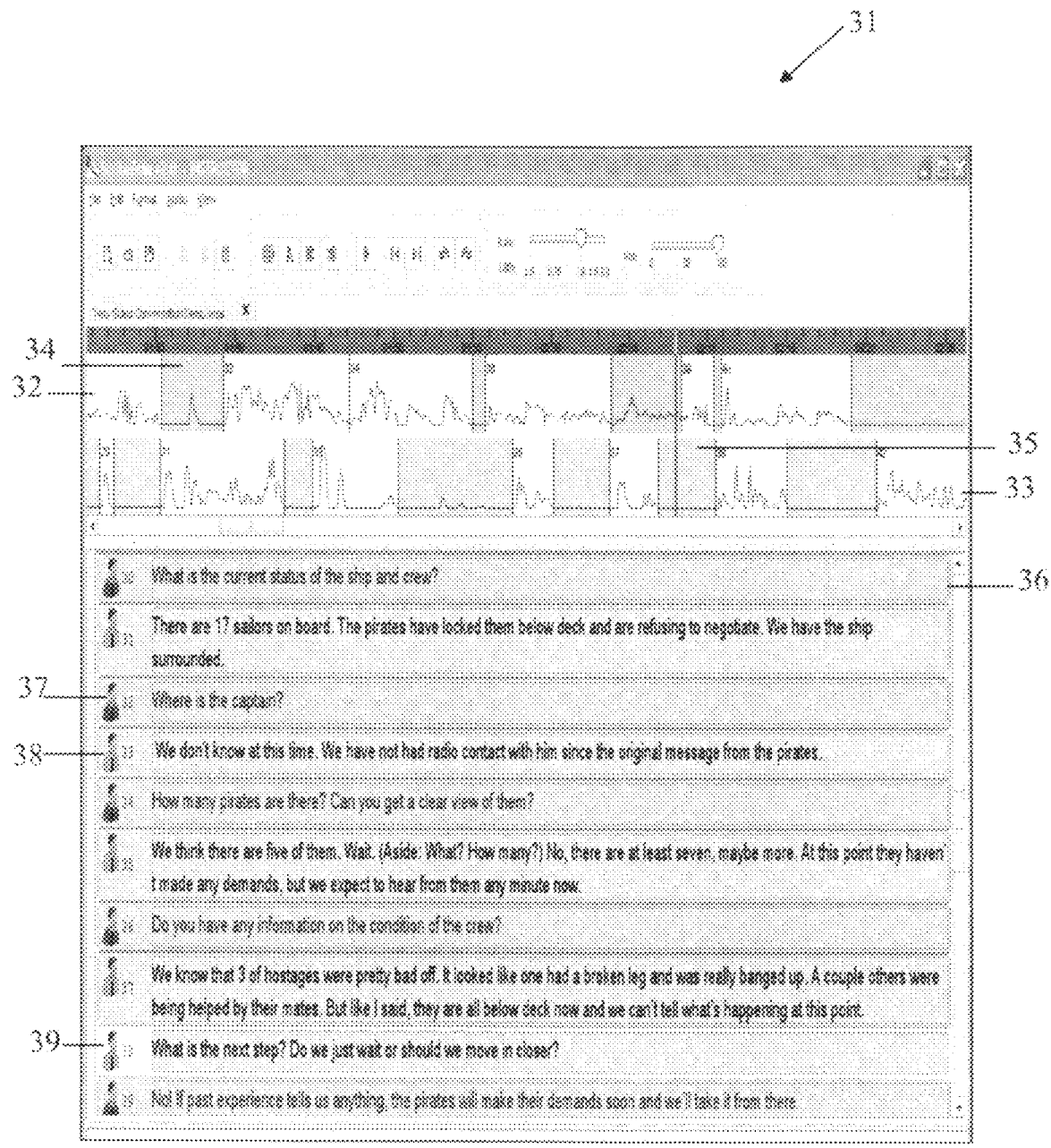
FIG. 3 is an illustration of segmented audio for two channels with corresponding text.

FIG. 3 is an illustration of a first display 31 of segmented audio for two speakers and corresponding text that results from the present invention. The display 31 includes a first waveform 32 for the first speaker and a second waveform 33 for the second speaker. The first waveform 32 and second waveform 33 have been segmented, where each segment 34 is uniquely identified. The segments 34 are uniquely identified with numbers, but other identification schemes are possible, as described above. One segment 35, numbered thirty-eight, has been selected. The transcripts 36 of the waveforms 32, 33 appear in the window 31. Portions of the transcript 36 that correspond to the segments 34 in the waveforms 32, 33 appear with the same unique identifiers as in the segments 34. Each individually identified transcript 36 portion associated with the first speaker includes an icon 37 to represent the transcript 36 portions spoken by the first speaker, which also corresponds to the audio represented by the corresponding segment 34 in the first waveform 32. Each individually identified transcript 36 portion associated with the second speaker includes an icon 38 to represent the transcript 36 portions spoken by the second speaker, which also corresponds to the audio represented by the corresponding segment 34 in the second waveform 33. The portion of the transcript 36 that is selected 35 in the second waveform 33 is highlighted 39 in the transcript 36, which is also numbered thirty-eight.

Figure 4:
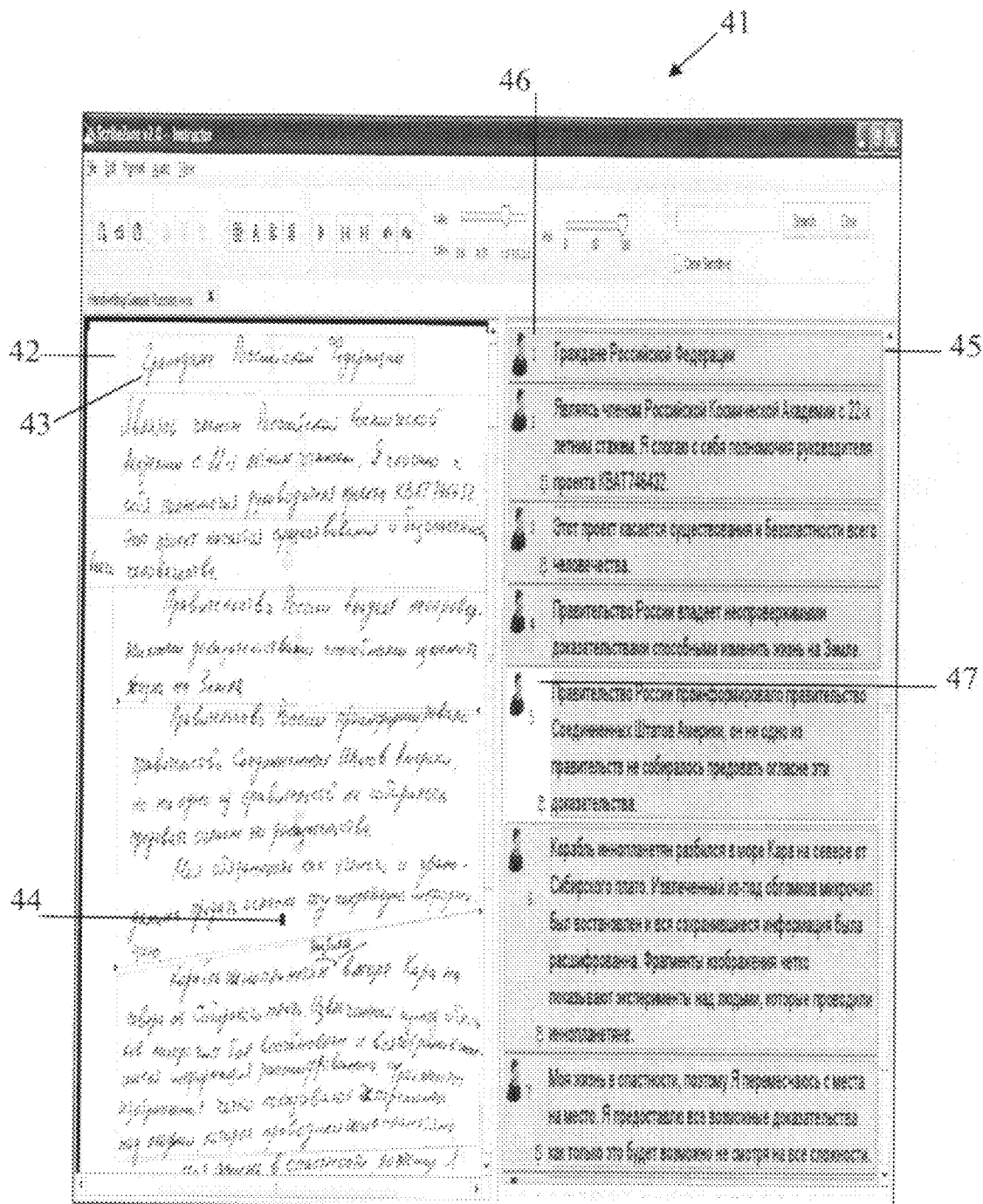
FIG. 4 is an illustration of segmented graphic with corresponding text.

FIG. 4 is an illustration of segmented graphic with corresponding text. FIG. 4 is an illustration of a first display 41 of a segmented graphic (i.e., a hand-written note) and corresponding text that results from the present invention. The display 41 includes the graphic 42. The graphic 42 has been segmented 43, where each segment is uniquely identified. The segments 43 are uniquely identified with numbers, but other suitable unique identifiers are possible (e.g., letters, icons, colors, etc.). One segment 44, numbered five has been selected. The transcript 45 of the graphic 42 appears in the window 41. Portions of the transcript 55 that correspond to the segments 43 in the graphic 42 appear with the same unique identifiers as in the segments 43. Each individually identified transcript 45 portion includes an icon 46 to represent the writer of that transcript 45 portion, which also corresponds to the graphic 42 represented by the corresponding segment 43 in the graphic 42. The portion of the transcript 45 that is selected 44 in the graphic 42 is highlighted 47 in the transcript 45, which is also numbered five.

Figure 5:
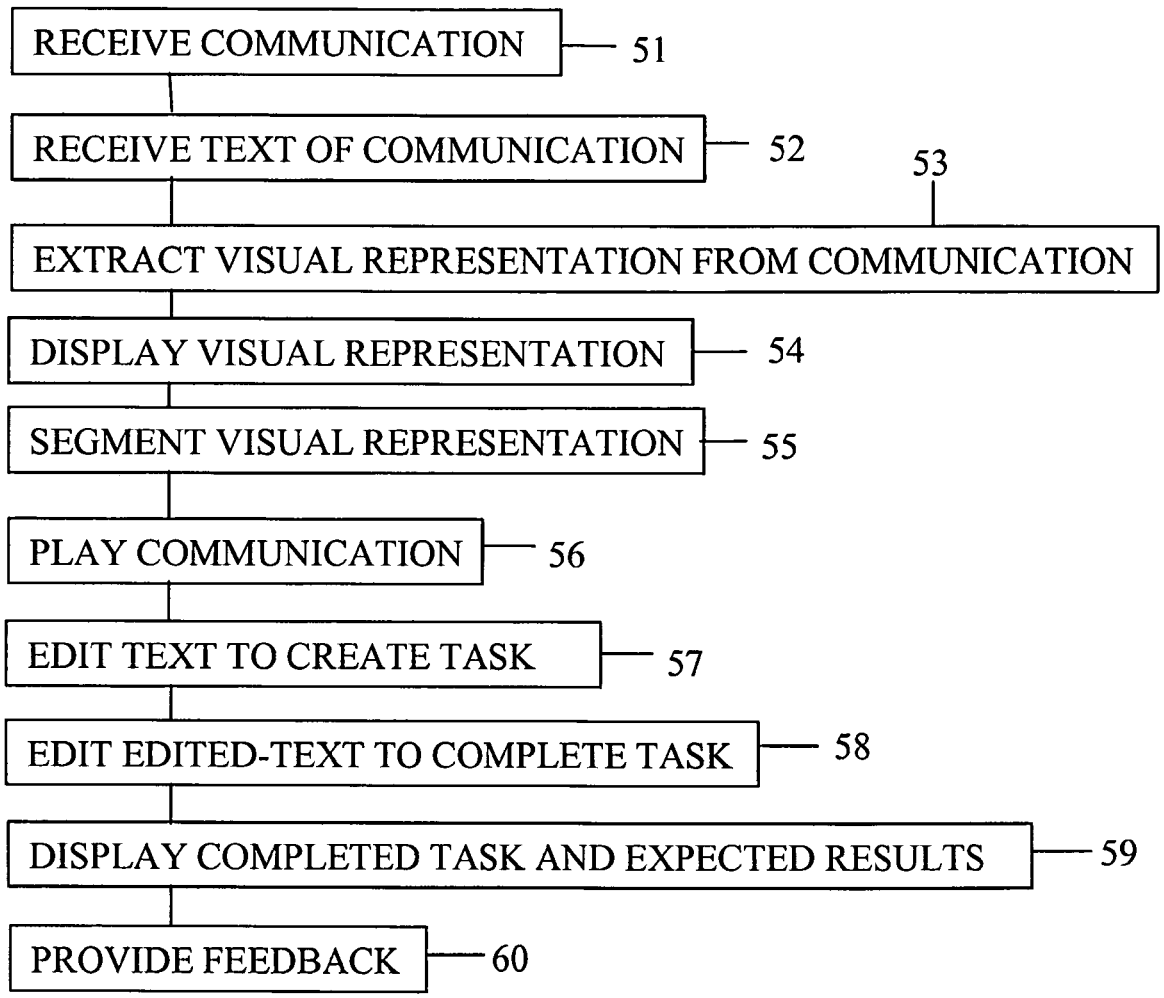
FIG. 5 is a flow chart of the steps of the present invention.

FIG. 5 is a flow chart of the steps of the method of the present invention.

The first step 51 of the present method device 1 is receiving at least one communication, where each communication is in at least one format (i.e., audio, video, graphic). The method can process a communication in any orthography or writing system (e.g., left-to-right, right-to-left, top-to-bottom, ideograms). The method can process a communication that includes a mixture of orthographical styles (e.g., left-to-right and right-to-left orthography in the same sentence).

The second step 52 of the present method is receiving a transcription (i.e., a textual representation of a communication in the language of the communication) for each received communication for which transcription is possible, where each character (e.g., letter, ideogram) in a transcription is associated with a location in the format of the corresponding communication that is represented by the transcribed character. That is, each textual representation in a transcription is identified with the point in the corresponding communication that caused the textual representation to be created, and vice versa.

The third step 53 of the present method extracting a visual representation of each communication received (i.e., an energy waveform for audio, which could include one or more speakers, a bar for representing length of video or area of graphic). If multiple (e.g., 2) speakers appear in a communication then multiple energy waveforms are extracted from the communication, one for each speaker. When multiple visual representations are extracted, they will be displayed separately but in sufficiently close proximity to indicate the association between the representations (e.g., one on top of the other for side-by-side comparison).

The fourth step 54 of the present method is displaying a visual representation of a communication and its transcription. In the preferred embodiment, the display is a window on a computer. The transcription may be displayed in any orthography. A user can easily navigate through the visual representation of a communication and/or its associated transcription by selecting an area within the visual representation of transcription (e.g., clicking an area via a computer mouse, keyboard key, foot pedal, or any other suitable input device). The method allows for multiple exercises and media to be processed simultaneously. The method allows multilingual input from any font set and keyboard layout and can mix different orthographic languages (e.g., right-to-left languages such as Arabic and Persian with left-to-right languages such as English and French). The method allows insertion of hyperlinks to the Internet and to documents (e.g., reference material). The method supports any text formatting capability (e.g., highlight, bold, underline, bullets, and color). The method allows for the insertion of pictures and maps for reference. The method allows for tagging and linking of text/audio/video material for quick and easy reference and comparison. Text can be copied/cut/pasted into each step of the method.

The fifth step 55 of the present method is segmenting the visual representation of a selected communication, where each segment is uniquely identified, and where each location in the corresponding transcription is identified with the same identifier. An analyst, courseware developer, or instructor segments the visual representation of a communication for his own purposes. For example, an instructor segments the visual representation of a communication in audio, video or graphic format. Since each part of a visual representation is associated with the corresponding transcript, segments established by an instructor are linked with the associated transcript. A segment is identified with a user-definable identification scheme (e.g., number, name, title, color, graphic, etc.). The corresponding transcription is assigned the same identification for easy identification and navigation of visual representation and corresponding text and vice versa. The present method provides a textual representation that captures the time boundaries of speech segments, locational boundaries of graphic segments, and the audio and locational boundaries of video, and links them together. Media segmentation is achieved with a few mouse clicks (click & drag or highlight+control/alt/b). Media segmentation and linkage to courseware enables easy content-based navigation of audio/video/graphic media. Instructors have the ability to easily divide or segment input media into chunks or segments, which are automatically linked with the corresponding text segment. Associated media and exercise segments are similarly numbered. This linkage enables easy content-based navigation of audio/video/graphic media. Segment start and end times are noted. Similarly identifying segmentations of a visual representation and their corresponding locations in a transcription enables faster navigation of language material. Speakers in a video may be identified, if desired, through marking/highlighting faces with circles.

The sixth step 56 of the present method is playing a communication, if possible. The sixth step 56 enables the playing of discrete sections of a visual representation. The sixth step 56 plays/displays any media format (e.g., mp3, .au, .mu, .wav, .jpg, .pdf, .bmp, .mp4, .mov, .wmv), accommodates unlimited audio file length, and includes audio manipulation features such as speed rate changer, user expansion/compression of energy signal, forward/backward skipping with mouse or key strokes, looping by highlighting section of media and playing it, single or multi-channel audio/media input, independent volume control per channel, cropping, editing, inserting silence, and foot pedal operation. Separate volume control is available for each speaker, including mute (auto-mute other speaker) to mitigate speakers talking over each other.

The seventh step 57 of the present method is editing a transcription of a communication. For example, an instructor may replace parts of a transcription with blanks that a student would then fill in as an exercise. A blank may concern a partial word, a single word, or multiple words. In addition, the seventh step 57 allows for the adding textual information to a transcription (e.g., glossaries, grammar notes, quizzes, comments, hints, instructional guidance). Instructors can easily create many different types of exercises, everything from aural vocabulary drills to expository writing. A blank for a student to type in is uniformly sized to not provide any unintended hints to the student and but are expandable to accommodate as much text as student wishes to insert. Text in a blank is visible and printable. Instructors may also include text in a blank for students to correct. The text in a blank may be of a different format or color to enable ease of location. Instructors may create a wide range of exercises such as aural vocabulary drills, grammar drills, transcription exercises (full verbatim or fill-in-the-blank), translation (verbatim, summary gist or guided translation) from graphic text, translation (verbatim, summary gist or guided translation) from aural text, combination transcription/translation exercises (full verbatim or guided), language identification training, dialect identification training, listening comprehension exercises, memory drills, contextual analysis drills, expository writing, quality control exercises: correction/editing of errorful or incorrect text. Instructor may preview the exercise.

The eighth step 58 of the present method is filling in blanks in a transcription and adding textual information. The eighth step 58 allows multilingual input in any font set and keyboard layout. Student types answer in blank. The blank expands to fit student's response. Tagging allows user to mark items for further review and/or group items. Students can only type in editable areas created by the instructor. Students cannot edit or delete text or alter text or audio segmentation. User can customize view. View of exercise can be single column or multi-column. Column width and height can be resized by user. Individual tool bars can be moved around, hidden or even dragged out of the tool window to maximize the size of the exercise. Font size, type, color, background color can all be customized by user. User can cut and paste text in and out of exercise. Text in the exercise is searchable. Text items in the exercise can be tagged to link contextual or lexical items. Words or phrases can be automatically looked up in on-line dictionaries. User can print exercise. Segment numbering and speaker identification prints along with exercise. User can print notes separately or together with exercise.

The ninth step 59 of the present method is displaying the student's responses to an exercise next to the expected responses. Instructors can evaluate student input through a side-by-side comparison view with the expected responses, and then annotate student input with feedback and comments. Such a side-by-side view may be used for multiple purposes: side-by-side transcription and translation as multilingual input is capable in all windows, triangulation capability of side-by-side text with audio. If a student selects a segment in one view, a cursor in the other view goes to the corresponding segment, the two segments are aligned to each other, and the media player 16 plays the segment.

The tenth step 60 of the present method is providing feedback on a completed exercise.

What is claimed is:

1. A device for language processing, comprising:
   a) a communication database containing communications, having an output;
   b) a transcription database containing a transcript for each communication in the communication database, where each character in a transcription is associated with a location in the format of the corresponding communication that is represented by the transcribed character, having an output for transmitting a transcript of a communication;
   c) an extractor, having an output;
   d) a first displayer, having a first input connected to the output of the text database, having a second input connected to the output of the extractor, having a third input, having a fourth input, having a fifth input, having a first output, having a second output, having a third output;
   e) a segmentor, having an output connected to the third input of the first displayer;
   f) a media player, having an input connected to the first output of the first displayer;
   g) a first editor, having has an output connected to the fourth input of the first displayer;
   h) a second editor, having an output connected to the fifth input of the first displayer;
   i) a second displayer, having an input connected to the second output of the first displayer; and
   j) a third displayer, having an input connected to the third output of the first displayer.

2. The device of claim 1, wherein said a communication database containing communications, where each communication in at least one format selected from the group of formats consisting of audio, video, graphic.

3. The device of claim 1, wherein said transcription database containing a transcript for each communication transcribed using characters selected from the group of characters consisting of letters and ideograms.

4. The device of claim 1, wherein said first displayer is a window on a computer that allows for insertion of hyperlinks to the Internet and to documents, highlighting, bolding, underlining, insertion of bullets, use of color, insertion of pictures and maps, tagging and linking of text/audio/video material, and copying, cutting, and pasting of text.

5. The device of claim 1, wherein said media player plays/displays media in formats selected from the group of formats consisting of mp3, .au, .mu, .wav, .jpg, .pdf, .bmp, .mp4, .mov, and .wmv.

6. The device of claim 1, wherein said media player accommodates unlimited audio file length, and includes audio manipulation features selected from the group of audio manipulation features consisting of speed rate changer, user expansion/compression of energy signal, forward/backward skipping with mouse or key strokes, looping by highlighting section of media, single or multi-channel audio/media input, independent volume control per channel, cropping, editing, inserting silence, foot pedal operation, separate volume control for each speaker, and muting.

7. A method of language processing, comprising the steps of:
   a) receiving at least one communication, where each communication is in at least one format;
   b) receiving a transcription for each received communication for which transcription is possible, where each character in a transcription is associated with a location in the format of the corresponding communication that is represented by the transcribed character;
   c) extracting a visual representation of each communication received;
   d) displaying a visual representation of a received communication and its transcription;
   e) segmenting the visual representation of a selected communication, where each segment is uniquely identified, and where each location in the corresponding transcription is identified with the same identifier;
   f) playing a communication, if possible;
   g) editing a transcription of a communication;
   h) filling in blanks in a transcription and adding textual information;
   i) displaying edits to corresponding entries in transcription; and
   j) providing feedback.

8. The method of claim 7, wherein said step of receiving at least one communication, where each communication is in at least one format is comprised of the step of receiving at least one communication, where each communication is in at least one format, where the format is selected from the group of formats consisting of audio, video, and graphic.

9. The method of claim 7, wherein said step of receiving a transcription for each received communication is comprised of the step of receiving a transcription for each received communication where each transcribed character is selected from the group of characters consisting of a letter and an ideogram.

10. The method of claim 7, wherein said step of extracting a visual representation of each communication received is comprised of the step of extracting a visual representation from the group of visual representations consisting of an energy waveform for audio for at least one speaker, a bar representing length of video and area of graphic.

11. The method of claim 7, wherein said step of displaying a visual representation of a received communication and its transcription is comprised of the step of displaying a visual representation in a window on a computer, where the transcription is displayed in any orthography, where the visual representation and transcription are navigated by selecting an area within the visual representation, clicking an area via a computer mouse, keyboard key, foot pedal, and any other suitable input device, where the transcription may be multilingual and in any font set and in any orthography or mixture of orthography, include hyperlinks to the Internet and to documents, picture, and maps, includes text highlighting, bolding, underlining, bullets, and color.

12. The method of claim 7, wherein said step of segmenting the visual representation of a selected communication is comprised of the step of segmenting the visual representation of a selected communication by uniquely identifying a segment with an identifier selected from the group of identifiers consisting of number, name, title, color, and graphic, assigning the identifier of a segment to the corresponding area in the transcription, and identifying areas in video with identifiers selected from the group of identifiers consisting of a mark, a highlight, and circles.

13. The method of claim 7, wherein said step of playing a communication, if possible is comprised of playing a communication in any format selected from the group of formats consisting of mp3, .au, .mu, .wav, .jpg, .pdf, .bmp, .mp4, .mov, and .wmv and manipulating the playing of a communication using a manipulation technique selected from the group of manipulation techniques consisting of speed rate changer, user expansion/compression of energy signal, forward/backward skipping, looping by highlighting section of communication, independent volume control per speaker, cropping, editing, inserting silence, foot pedal operation, and muting.

14. The method of claim 7, wherein said step of editing a transcription of a communication is comprised of the step of editing a transcription by replacing a portion of a transcription with a uniformly sized blank that may later be filled in with a correct response in user-definable format and color, where the blank is expandable to accommodate any response length, where the blank may concern a partial word, a single word, multiple words, and errorful text to be further edited and corrected, and where textual information may be added to a transcription to include glossaries, grammar notes, quizzes, comments, hints, and instructional guidance.

15. The method of claim 7, wherein said step of filling in blanks in a transcription and adding textual information is comprised of the step of filling in blanks in a transcription and adding textual information to blanks that expand to accommodate responses, tagging portions of the transcription for further review, grouping items, customizing view by number of columns, column width, column height, toolbar manipulation, font size, font type, font color, background color, cutting and pasting text, searching text, tagging text, and accessing on-line dictionaries.

16. The method of claim 7, wherein said step of displaying edits to corresponding entries in transcription is comprised of the step of displaying edits to corresponding entries in transcription using side-by-side comparison views with the expected responses.

* * * * *